US008462953B2

United States Patent
Tsai et al.

(10) Patent No.: US 8,462,953 B2
(45) Date of Patent: Jun. 11, 2013

(54) COMMUNICATION SYSTEM AND METHOD THEREOF

(75) Inventors: Yi-Hsueh Tsai, Taipei County (TW); Frank Chee-Da Tsai, Taipei (TW); Hua-Chang Yin, Taoyuan County (TW)

(73) Assignee: Institute for Information Industry, Taipei (TW)

( * ) Notice: Subject to any disclaimer, the term of this patent is extended or adjusted under 35 U.S.C. 154(b) by 1357 days.

(21) Appl. No.: 11/963,859

(22) Filed: Dec. 24, 2007

(65) Prior Publication Data

US 2010/0020974 A1    Jan. 28, 2010

(51) Int. Cl.
*H04K 1/00* (2006.01)
*H04L 9/00* (2006.01)
*H04L 9/08* (2006.01)
*H04L 9/32* (2006.01)

(52) U.S. Cl.
USPC ........... 380/273; 380/270; 380/277; 380/278; 380/279; 380/281; 713/168; 713/171

(58) Field of Classification Search
USPC .......... 380/255, 270, 273, 277–285; 713/163, 713/171, 277, 150, 168
See application file for complete search history.

(56) References Cited

U.S. PATENT DOCUMENTS

| | | | | |
|---|---|---|---|---|
| 7,599,496 B2 * | 10/2009 | Hengeveld et al. | ........... | 380/278 |
| 7,907,733 B2 * | 3/2011 | Cho et al. | ........... | 380/273 |
| 8,045,715 B2 * | 10/2011 | Kuo | ........... | 380/277 |
| 8,160,254 B2 * | 4/2012 | Cho et al. | ........... | 380/273 |
| 8,306,229 B2 * | 11/2012 | Pang et al. | ........... | 380/278 |
| 2004/0054891 A1 * | 3/2004 | Hengeveld et al. | ........... | 713/163 |
| 2005/0228997 A1 * | 10/2005 | Bicker | ........... | 713/171 |
| 2007/0076885 A1 * | 4/2007 | Sood et al. | ........... | 380/270 |
| 2007/0147620 A1 * | 6/2007 | Zheng et al. | ........... | 380/277 |
| 2008/0037482 A1 * | 2/2008 | Douglas et al. | ........... | 370/338 |
| 2008/0080713 A1 * | 4/2008 | Cho et al. | ........... | 380/273 |
| 2009/0172403 A1 * | 7/2009 | Liang et al. | ........... | 713/171 |

(Continued)

FOREIGN PATENT DOCUMENTS

| | | |
|---|---|---|
| KR | 20030056568 | 7/2003 |
| KR | 1020050010992 | 1/2005 |
| WO | 2007019672 A1 | 2/2007 |

OTHER PUBLICATIONS

[Arnaud Tonnerre, Adrien Duprez, Djamal-Eddine Meddour, Peng Yong Kong, D. J. Shyy, Saravanan Govindan, Pek Yew Tan, Seth Spoenlein, Ranga Reddy, Byoung-Jo "J" Kim], [Cross Communications], [Sep. 19, 2009], [14 pages], [IEEE], [Canada].
[[Arnaud Tonnerre, Adrien Duprez, Djamal-Eddine Meddour, Peng Yong Kong, D. J. Shyy, Saravanan Govindan, Pek Yew Tan, Seth Spoenlein, Ranga Reddy, Byoung-Jo "J" Kim], [SMART Relay Alliance proposal], [Nov. 7, 2006], [29 pages], [IEEE], [USA].

(Continued)

*Primary Examiner* — Tae Kim
(74) *Attorney, Agent, or Firm* — Winston Hsu; Scott Margo

(57) ABSTRACT

A communication system for transmitting data of a first mobile station to a second mobile station includes a base station and a relay device. The base station is utilized for configuring an uplink and a downlink of the data to correspond to a first connection ID and a second connection ID respectively and for transmitting a traffic encryption key to the first and second mobile stations so that the first and second mobile stations share the traffic encryption key. The relay device is coupled to the base station and the first and second mobile stations via wireless communication, and utilized for receiving the data encrypted by the traffic encryption key and transferring the data of the first mobile station to the second mobile station according to the first and second connection IDs without going via the base station.

11 Claims, 3 Drawing Sheets

U.S. PATENT DOCUMENTS

2009/0235075 A1* 9/2009 Cho et al. .................. 713/170
2009/0276629 A1* 11/2009 Wu et al. .................... 713/175
2009/0300358 A1* 12/2009 Pang et al. ................. 713/171
2011/0194697 A1* 8/2011 Pang et al. ................. 380/279

OTHER PUBLICATIONS

Sen Xu et al., "Secure multicast in various scenarios of Wireless-MAN", Proceedings of SoutheastCon 2007, pp. 709-714, Mar. 2007.

* cited by examiner

COMMUNICATION SYSTEM AND METHOD THEREOF

BACKGROUND OF THE INVENTION

1. Field of the Invention

The present invention relates to a wireless communication scheme, and more particularly, to a communication system and related method for directly transmitting data of a mobile station to another mobile station through a relay device without going via a base station.

2. Description of the Prior Art

For a communication system complying with the IEEE 802.16x standard, such as the Worldwide Interoperability for Microwave Access (WIMAX) system, the essential framework of the communication system is to utilize a base station to transfer data between mobile stations served by the base station itself. If two mobile stations communicate with each other in this condition, data transmitted by either one of the mobile stations will pass through the base station; the data is transmitted according to a point-to-multipoint mode. In order to achieve throughput enhancement and coverage extension, in the IEEE 802.16j specification, it is mentioned that multiple relay stations can be further used between a base station and mobile stations for conveying data. For the wireless network topology formed by the base station, relay stations, and the mobile stations, control signaling and data transmission is usually achieved according to a tree model. When the relay stations are used for achieving throughput enhancement and coverage extension, both control signaling and data actually transmitted in this transmission scheme is controlled via the base station, and a situation where the data is transmitted between the mobile stations in private can be avoided. An advantage is that the base station can directly control the transmission scheme once service provided by the transmission scheme is charged or the transmission scheme needs to execute service interruption. In this situation, only the base station has the capability of service destruction.

If all the transmitted data passes through the base station, the bandwidth resource of the communication system, however, will be greatly wasted. For example, if a mobile station MS1 transmits an amount of data to a mobile station MS2, then this amount of data may be transmitted to a base station through a certain relay station on the uplink associated with the data. It is possible that the data is transmitted to the same relay station from the base station on the downlink and then the data is transmitted to the mobile station MS2 from this relay station. As mentioned above, it is evident that the bandwidth and computation resource between the relay station and base station are occupied twice when the data is transmitted via the uplink and downlink. To solve this problem, if the above-described relay station directly transfers the data to the mobile station MS2 after receiving the data from the mobile station MS1 for preventing system resources from being consumed by the base station, this, however, does not comply with the originally developed standard: data communication between mobile stations are centrally controlled by the base station. Therefore, an acceptable method is that signaling data for control signaling is still controlled by the base station, but bearer data for data transmission can be directly transmitted from one mobile station to another mobile station through relay station(s) without going via the base station. The reason is that the signaling data in general does not occupy excessive bandwidth resources while the bearer data may be multimedia data and therefore occupies more bandwidth resources.

For a WIMAX communication system, another serious problem, however, will result from using relay station(s) to transmit data without going via a base station. The problem is that a mobile station receiving the data cannot decrypt this data. This is because the WIMAX system supports end-to-end security, i.e., each mobile station and one base station has a shared secret key but a plurality of intermediate relay stations do not have the shared secret key. Originally, if all data (i.e. signaling data and bearer data) passes through the base station, the mobile station MS1 encrypts the data with key KEY1 and the base station can decrypt the data with key KEY1. The base station then encrypts the data with another key KEY2, and the mobile station MS2 can decrypt the data with the key KEY2. If, however, the data is directly transmitted through the relay station(s) without going via the base station, the mobile station MS1 encrypts the data with the key KEY1, but the mobile station MS2 cannot decrypt the data because the mobile station MS2 does not obtain the key KEY1 (the mobile station MS2 only has the key KEY2). That is, the data cannot be decrypted although it can be correctly received. The base station may share the key KEY1 with the relay station(s) so that the relay station(s) can use the key KEY1 to decrypt the data transmitted by the mobile station MS1 and then use the key KEY2 to encrypt the received data so that the mobile station MS2 can decrypt the data transmitted from the relay station(s) with key KEY2. However, a more complicated scheme will be required to synchronously update the keys shared between the base station and relay station(s). Of course, this breaks end-to-end security provided by the WIMAX communication system.

SUMMARY OF THE INVENTION

In order to effectively reduce consumption of network bandwidth/computation resource to improve the transmission efficiency and to make a mobile station correctly decrypt received data, one of the objectives of the present invention is therefore to provide a communication system and related method for transmitting a traffic encryption key to multiple mobile stations so that the mobile stations can share the traffic encryption key together, to solve the above-mentioned problems.

According to an embodiment of the present invention, a communication system for transmitting data of a first mobile station to a second mobile station is disclosed. The communication system comprises a base station and a relay device. The base station is utilized for configuring an uplink and a downlink of the data to correspond to a first connection ID and a second connection ID respectively, and for transmitting a traffic encryption key to the first and second mobile stations such that the first and second mobile stations can share the traffic encryption key together. The relay device is coupled to the base station and the first and second mobile stations, and used for receiving the data encrypted by the traffic encryption key and transferring the data of the first mobile station to the second mobile station through appropriate mapping according to the first and second connection IDs without going via the base station.

According to the embodiment of the present invention, a communication method for transmitting data of a first mobile station to a second mobile station is further disclosed. The method comprises the following steps: providing a base station and utilizing the base station to configure an uplink and a downlink of the data to respectively correspond to a first connection ID and a second connection ID, and transmitting a traffic encryption key to the first and second mobile stations such that the first and second mobile stations share the traffic encryption key; and utilizing a relay device to receive the data encrypted by the traffic encryption key and transferring the data of the first mobile station to the second mobile station through appropriate mapping according to the first and second connection IDs without going via the base station.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
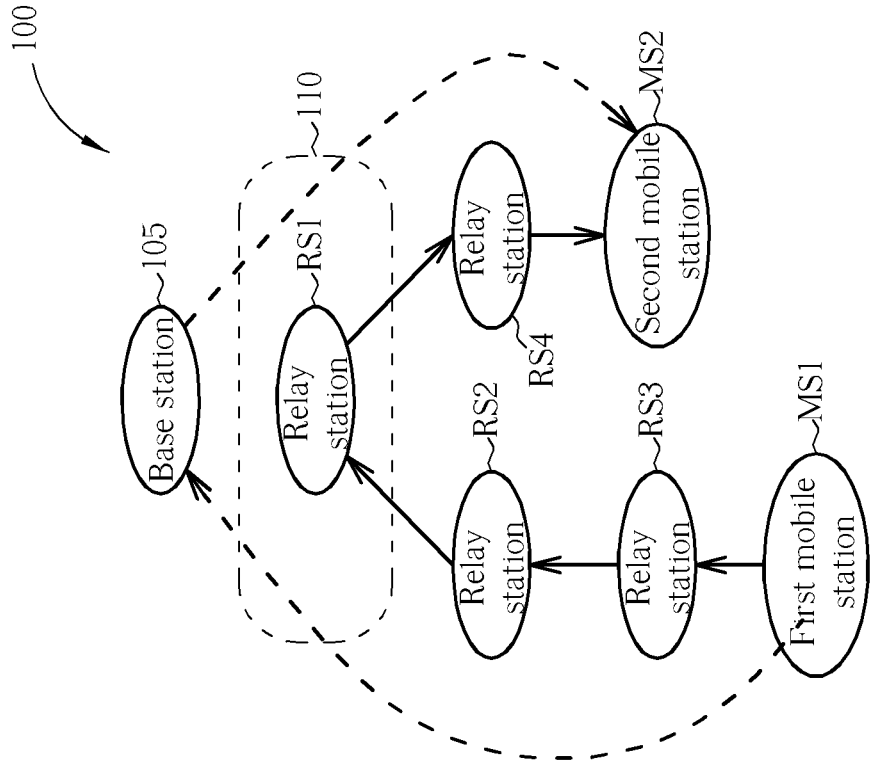
FIG. 1 is a diagram of a communication system according to an embodiment of the present invention.

Please refer to FIG. 1. FIG. 1 is a diagram of a communication system 100 according to an embodiment of the present invention. As shown in FIG. 1, the communication system 100 includes a base station 105, a relay device 110, and other relay stations, wherein the relay device 110 is a relay station RS1 in the embodiment. The communication system 100 also complies with the WIMAX communication standard, and data can be transmitted between different mobile stations by cross communication via the communication system 100. For example, in FIG. 1, a certain amount of data of a first mobile station MS1 is transmitted to a second mobile station MS2 by the communication system 100, where broken lines respectively represent an uplink of the data and a downlink of the data while solid lines together represent a path which the data passes through in practice. The base station 105 configures the uplink and downlink of the data to respectively correspond to a first connection ID (CID) and a second CID, and also transmits a traffic encryption key (TEK) to the first and second mobile stations MS1 and MS2 so that the first and second mobile stations MS1 and MS2 can share this traffic encryption key. The relay device 110 is coupled between the base station 105 and the first and second mobile stations MS1 and MS2, and used for receiving the data encrypted by the traffic encryption key and then transferring the data of the first mobile station MS1 to the second mobile station MS2 according to the first and second CIDs without going via the base station 105. In other words, the relay device 110 only transmits the data without encrypting/decrypting the data further. In particular, in this embodiment, the communication system 100 still controls signaling data of this transmission scheme via the base station 105. The base station 105 periodically updates the traffic encryption key so that the first and second mobile stations MS1 and MS2 can share the identical traffic encryption key at the same time. Thus, the second mobile station MS2 can directly decrypt data transmitted from the first mobile station MS1.

In this embodiment, two scenarios that the base station 105 updates the traffic encryption key periodically are provided in the following. In the first scenario, the traffic encryption key is periodically updated by using multicast. First of all, the base station 105 encrypts a group key encryption key (GKEK), which is used to encrypt/decrypt the traffic encryption key, and transmits the encrypted GKEK to the first and second mobile stations MS1 and MS2 for updating via a primary management connection. The traffic encryption key is then broadcasted by the base station 105 to be transmitted to the first and second mobile stations MS1 and MS2 after being encrypted by the GKEK, and data is encrypted by the traffic encryption key and transmitted via a transport connection. Therefore, the problems caused by the prior art scheme can be solved in this embodiment. In addition, since the first and second mobile stations MS1 and MS2 share the same traffic encryption key, this means that security levels are identical when the data are transmitted through the uplink and downlink. Besides, because each relay station on the path does not obtain the GKEK, each relay station cannot decrypt the transmitted data. Accordingly, the communication system 100 in the present invention can support end-to-end security.

In the second scenario, instead of using the base station 105 to periodically update the traffic encryption key by multicast, the first and second mobile stations MS1 and MS2 actively issue requests to the base station 105 for updating the traffic encryption key. If one of the first and second mobile stations MS1 and MS2 notifies the base station 105 that the traffic encryption key is about to expire (the key update has to be done prior to the expiry of a used key), the base station 105 does not update the traffic encryption key immediately until the other of the first and second mobile stations MS1 and MS2 also notifies the base station 105 that the traffic encryption key is about to expire. The traffic encryption key shared by the first and second mobile stations MS1 and MS2 can therefore be updated simultaneously. To shorten the length of this specification, a sequence diagram related to an update of the traffic encryption key is omitted for brevity.

In order to achieve cross communication, in this embodiment, the relay device 110 (i.e. the relay station RS1), which has cross communication capability, includes a mapping table in which it is recorded that the first CID of the data is mapped into the second CID so that the relay device 110 can transfer the data of the first mobile station MS1 to the second mobile station MS2. In general, when configuring the first and second CIDs, the base station 105 often configures the first and second CIDs to become different; thus, the relay device 110 can map the first CID of the data into the second CID according to the mapping table, and then transfer the data from the first mobile station MS1 to the second mobile station MS2. In another example, in contrast, the base station 105 configures the first and second CIDs to become identical at connection setup, i.e., the uplink and downlink of the data both correspond to the same CID. In this example, the function of the above-mentioned mapping table is optional, and the relay device 110 can transmit the data to the second mobile station MS2 without modifying the first CID of the data since the first and second CIDs are identical.

Figure 2:
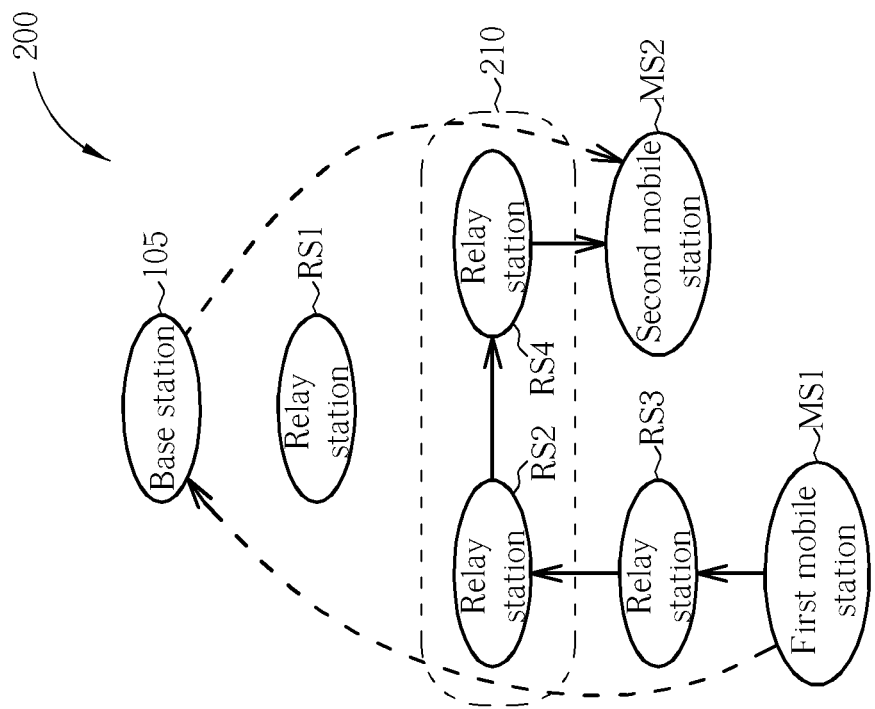
FIG. 2 is a diagram of a communication system according to another embodiment of the present invention.

Additionally, in another embodiment, a relay device can also be composed of two or more relay stations, such as a relay device 210 of a communication system 200 shown in FIG. 2. The number of relay stations included within a relay device is not meant to be a limitation of the present invention. Furthermore, since not all relay stations have cross communication capability as described in the present invention, relay station(s) having cross communication capability will be selected and a shortest transmission path will be determined first before transmitting data. The definition of the shortest transmission path can be defined as a path using minimum connection(s) for transmission, a path occupying minimum network bandwidth resource for transmission, or a path least easily causing network congestion during transmission, and so on; the definition of the shortest transmission path can be considered to become different in various conditions according to requirements of system designers. As described above, when the first mobile station MS1 requests to communicate with the second mobile station MS2, the communication systems 100/200 first seeks relay station(s) on the uplink which data of the first mobile station MS1 passes through. For instance, the communication system 100 shown in FIG. 1 seeks out the relay stations RS1, RS2, and RS3. The communication system 100/200 then seeks relay station(s) on the downlink of the data, e.g., the communication system 100 seeks out the relay stations RS1 and RS4. Subsequently, taking the embodiment shown in FIG. 1 as an example, the communication system 100 excludes relay stations without cross communication capability and only includes those having cross communication capability among candidate relay stations. Finally, the communication systems 100 and 200 can respectively select appropriate station(s) from candidate relay stations as each relay device in the above-mentioned embodiments according to the definition of the shortest transmission path formulated by system designers themselves. For instance, in FIG. 1, the relay station RS1 is selected as the relay device 110 of the first embodiment.

Figure 3:
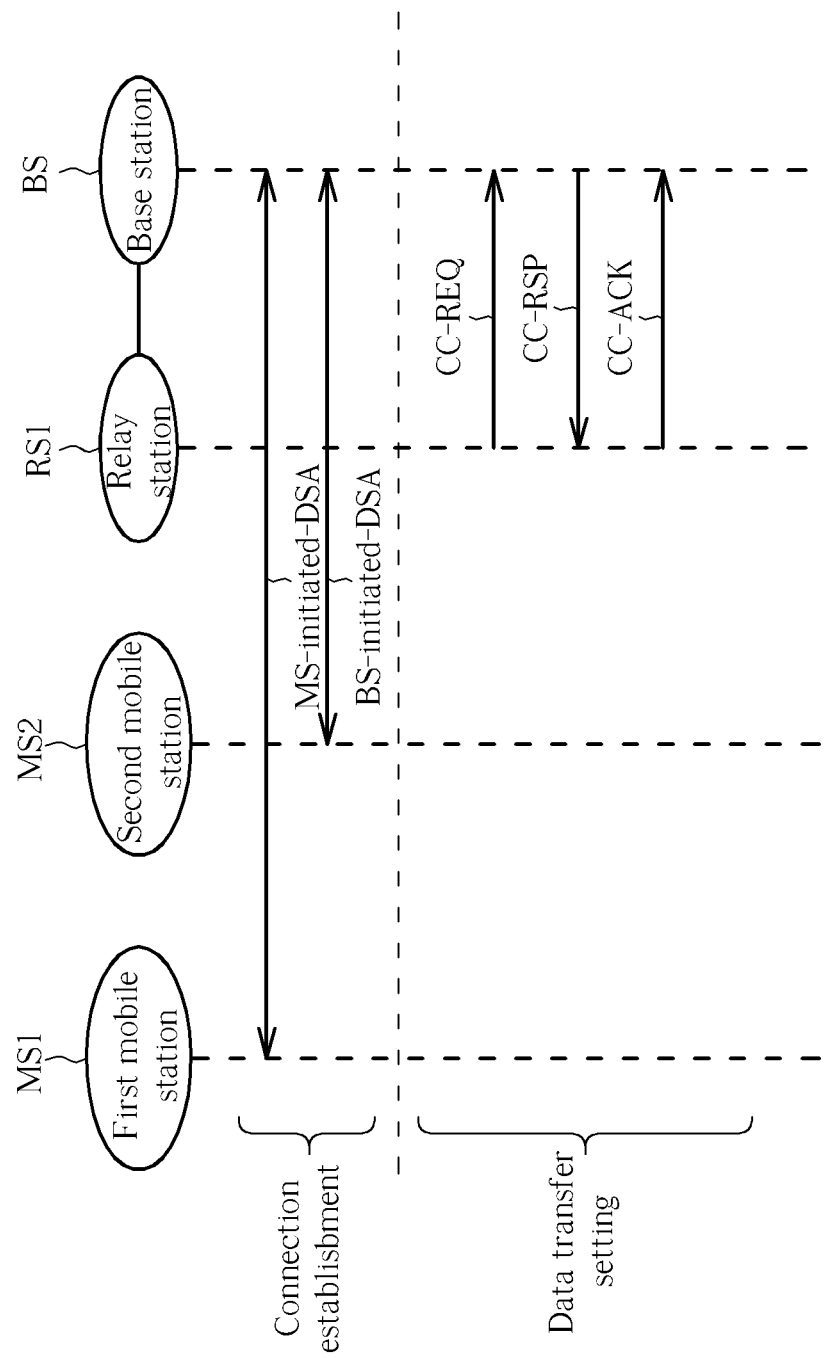
FIG. 3 is a sequence diagram illustrating a base station of FIG. 1 configuring data transfer setting upon the relay station RS1.

The base station 105 of the communication system 100 then configures related data transfer setting upon the relay station RS1. Please refer to FIG. 3. FIG. 3 is a sequence diagram illustrating the base station 105 of FIG. 1 configuring the data transfer setting upon the relay station RS1. In general, as shown in FIG. 3, after excluding the relay stations without cross communication capability, a relay station with cross communication capability, e.g. the relay station RS1, on the selected shortest transmission path issues a cross communication request command CC-REQ to the base station 105, and then the base station 105 determines whether to accept/reject the relay station RS1 for cross communication; i.e. the data transmission scheme for cross communication is still controlled by the base station 105. If the base station 105 accepts the cross communication request command CC-REQ, the base station 105 will issue a cross communication response command CC-RSP back to the relay station RS1. After the cross communication response command CC-RSP is received by the relay station RS1, the relay station RS1 returns an acknowledge command CC-ACK to the base station 105. After this, the relay station RS1 has been configured as the relay device 110, and the setting for the mapping table of the relay station has also been completed so that cross communication can be activated immediately. Of course, before the procedure of data transfer setting, the first mobile station MS1 and base station 105 need to communicate with each other via dynamic service addition (DSA) using three-way handshake. In order to simplify the specification, in FIG. 3, the DSA using three-way handshake is represented only by MS-initiated-DSA while DSA using three-way handshake between the base station 105 and second mobile station MS2 is represented by BS-initiated-DSA. Finally, it should be noted that the above-mentioned communication systems in the whole specification all comply with the WIMAX communication standard; this, however, is not meant to be a limitation of the present invention.

Those skilled in the art will readily observe that numerous modifications and alterations of the device and method may be made while retaining the teachings of the invention.

What is claimed is:

1. A communication system for transmitting data of a first mobile station to a second mobile station, comprising:
    a base station, for configuring an uplink and a downlink of the data to correspond to a first connection ID and a second connection ID respectively, and for transmitting a traffic encryption key to the first and second mobile stations such that the first and second mobile stations share the traffic encryption key; and
    a relay device, coupled to the base station and the first and second mobile stations, for receiving the data encrypted by the traffic encryption key and transferring the data of the first mobile station to the second mobile station according to the first and second connection IDs without going via the base station;
    wherein the base station periodically updates the traffic encryption key shared by the first and second mobile stations; and, when one of the first and second mobile stations notifies the base station that the traffic encryption key is about to expire, the base station does not update the traffic encryption key until the other of the first and second mobile stations notifies that base station that the traffic encryption key is about to expire.

2. The communication system of claim 1, wherein the first connection ID is identical to the second connection ID, and the base station configures the uplink and the downlink of the data to correspond to the same connection ID.

3. The communication system of claim 1, wherein the base station periodically actively updates the traffic encryption key shared by the first and second mobile stations by multicast to ensure that the traffic encryption key is not expired.

4. The communication system of claim 1, wherein the relay device is a relay station having a mapping table, the relay station is utilized for receiving the data and mapping the first connection ID of the data to the second connection ID by the mapping table, so as to transfer the data of the first mobile station to the second mobile station.

5. The communication system of claim 1, wherein the relay device comprises a plurality of relay stations, and the relay stations are utilized for receiving the data and transferring the data of the first mobile station to the second mobile station without going via the base station.

6. The communication system of claim 1, which complies with a worldwide interoperability for microwave access communication standard.

7. A communication method for transmitting data of a first mobile station to a second mobile station, comprising:
    providing a base station and utilizing the base station to configure an uplink and a downlink of the data to respectively correspond to a first connection ID and a second connection ID, and transmitting a traffic encryption key to the first and second mobile stations such that the first and second mobile stations share the traffic encryption key;
    utilizing a relay device to receive the data encrypted by the traffic encryption key and transferring the data of the first mobile station to the second mobile station according to the first and second connection IDs without going via the base station;
    periodically updating the traffic encryption key shared by the first and second mobile stations; and
    when one of the first and second mobile stations notifies the base station that the traffic encryption key is about to expire, not updating the traffic encryption key until another of the first and second mobile stations notifies the base station that the traffic encryption key is about to expire.

8. The communication method of claim 7, wherein the first connection ID is identical to the second connection ID, and the step of configuring the uplink and the downlink of the data to respectively correspond to the first connection ID and the second connection ID comprises:
    configuring the uplink and the downlink of the data to correspond to the same connection ID.

9. The communication method of 7, further comprising:
using the base station to periodically actively update the traffic encryption key shared by the first and second mobile stations by multicast to ensure that the traffic encryption key is not expired.

10. The communication method of claim 7, wherein the relay device is a relay station, and the step of transferring the data of the first mobile station to the second mobile station according to the first and second connection IDs comprises:
providing a mapping table, receiving the data and mapping the first connection ID of the data to the second connection ID by the mapping table, so as to transfer the data of the first mobile station to the second mobile station.

11. The communication method of claim 7, which complies with a worldwide interoperability for microwave access communication standard.

* * * * *